June 30, 1942.  H. G. ALLEN ET AL  2,287,957

BAG CLOSING AND SEALING APPARATUS

Filed Aug. 4, 1940  6 Sheets-Sheet 3

INVENTOR
Howard G. Allen and
K. Clifford Saunders
BY James D. Bock
ATTORNEY

June 30, 1942.　　　H. G. ALLEN ET AL　　　2,287,957
BAG CLOSING AND SEALING APPARATUS
Filed Aug. 4, 1940　　　6 Sheets-Sheet 4
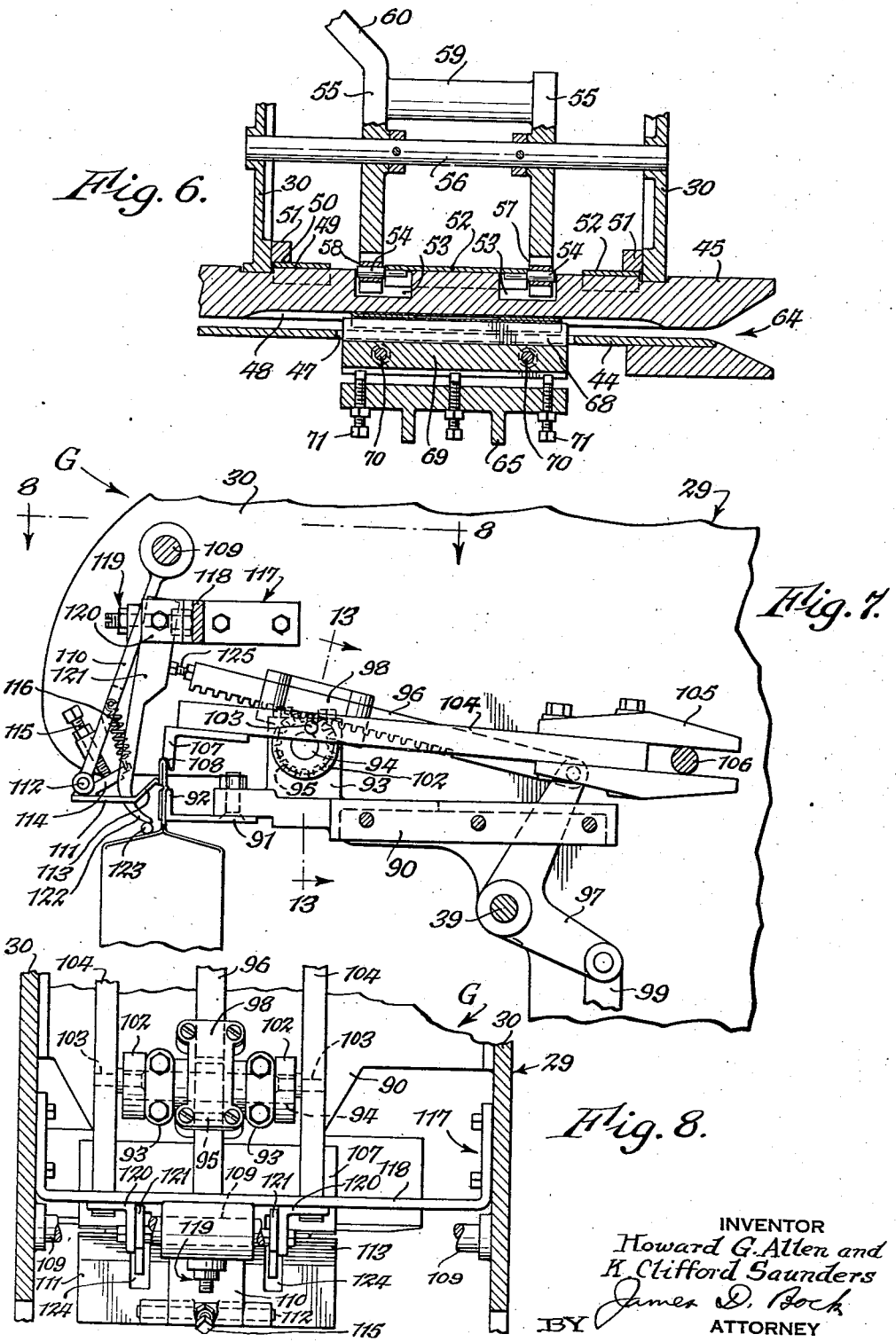
INVENTOR
Howard G. Allen and
K. Clifford Saunders
BY James D. Bock
ATTORNEY

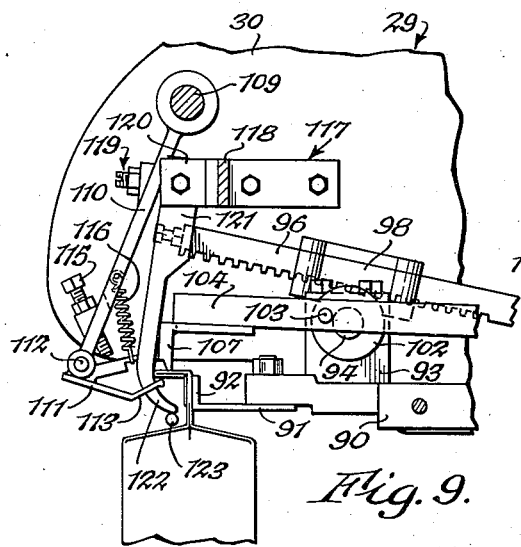
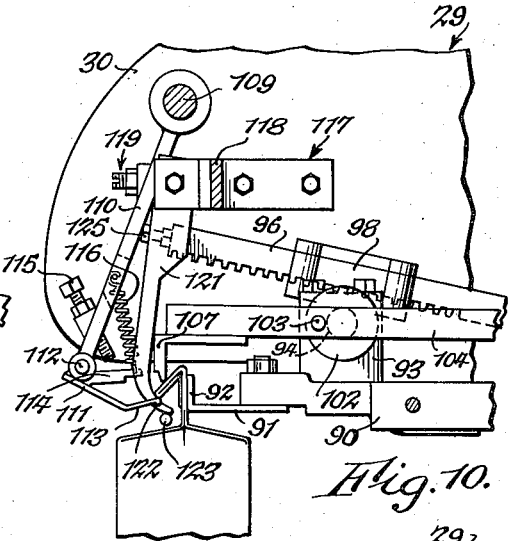
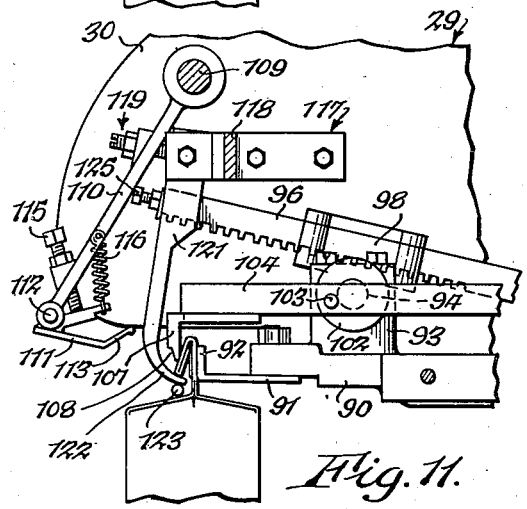
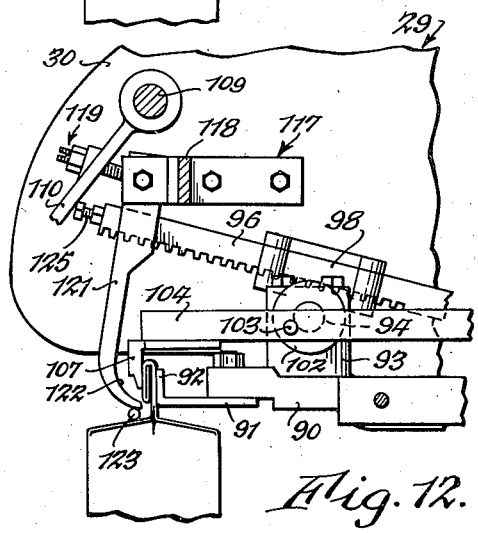
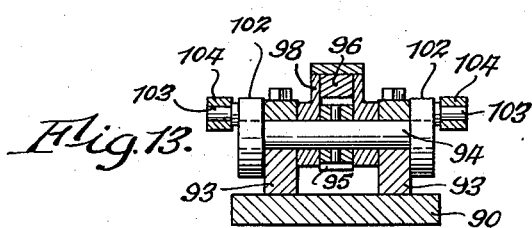
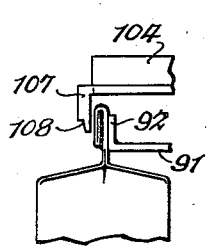

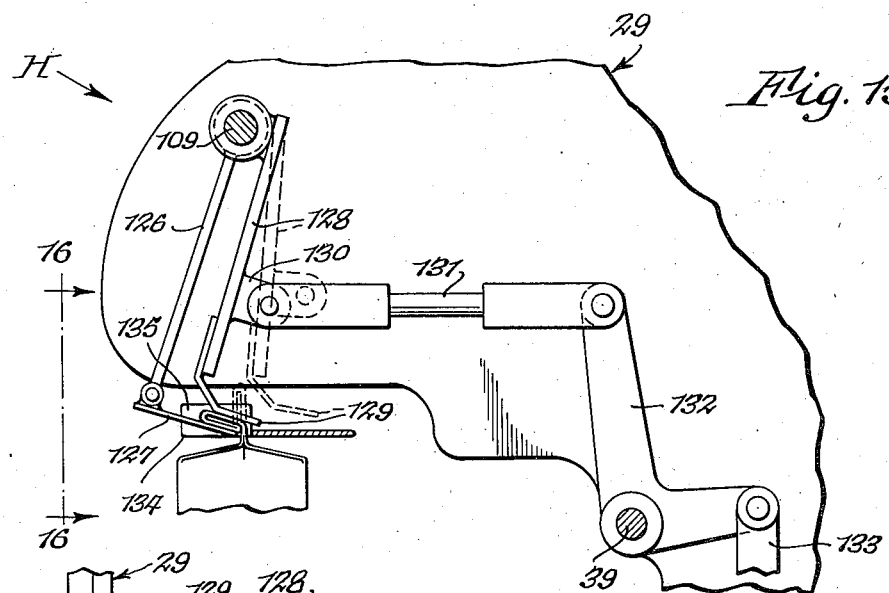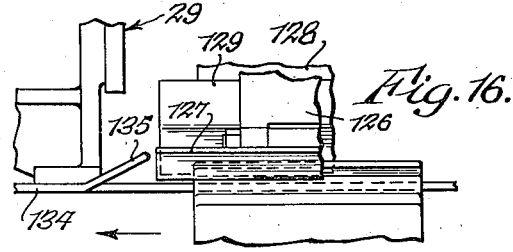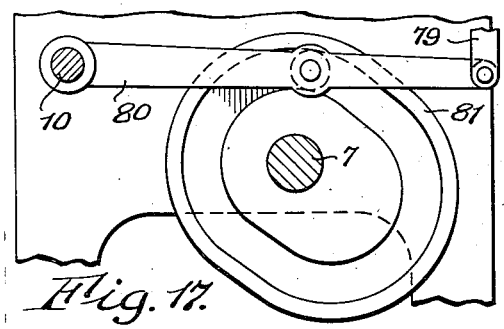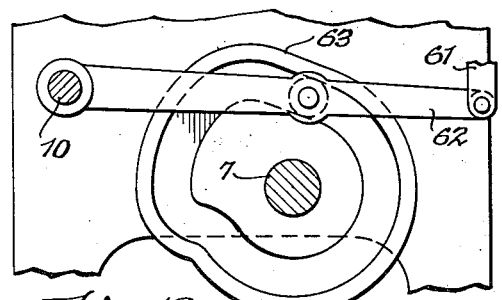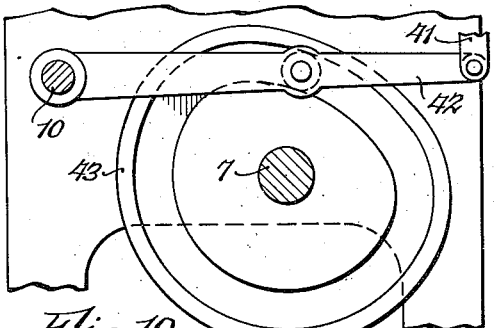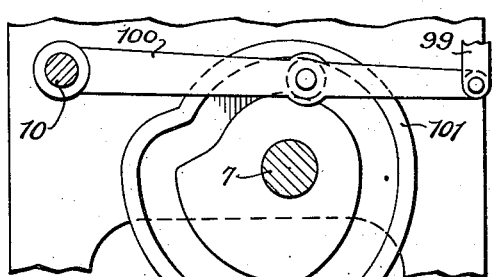

Patented June 30, 1942

2,287,957

UNITED STATES PATENT OFFICE 2,287,957

BAG CLOSING AND SEALING APPARATUS

Howard G. Allen, Niagara Falls, and Karl Clifford Saunders, Kenmore, N. Y., assignors to Consolidated Packaging Machinery Corporation, a corporation of New York Application August 4, 1940, Serial No. 351,374

18 Claims. (Cl. 93—6)

This invention relates to new and useful improvements in machines for automatically closing and sealing the mouths of filled paper bags and particularly seeks to provide novel mechanisms for forming the double-fold closures of slack filled bags.

In the packaging of certain bulk materials, such as sugar and the like, a definite desire has been evidenced by many of the packaging companies to utilize slack filled bags in order to avoid any tendency of the bag contents to cake or harden as they would do over a period of time if they were packed tightly.

Normally such commodities are packaged in paper bags, loosely filled, and sealed through the use of the common or double-fold closure. However, prior known mechanisms for forming the double-fold closure proved to be unsatisfactory since the closures formed thereby were either loosely folded or were not uniform. In the prior devices two general forms of mechanisms were used to form the closures, one of which creased the bag mouth and folded the bag mouth about the crease lines by twisted former bars between which the bag mouth was conveyed, and the other of which forced the folding by the use of mating folding members. The first of these prior structures failed to produce tight, well formed folds since the paper was not restrained at all times and the second was apt to effect an unequal drawing of the paper with consequent detrimental effects to the completed fold.

This invention overcomes the difficulties heretofore met in the mechanical formation of uniform, tightly folded closures of the double-fold type for paper bags and the like.

It is therefore an object of this invention to provide a machine for automatically forming double-fold closures on slack filled paper bags or the like.

Another object of the invention is to provide a machine of the character stated which first collapses the mouth of a filled bag presented thereto at one station, trims and creases the collapsed bag mouth then forms a first fold at a succeeding station, applies adhesive to the collapsed partly folded bag mouth, completes the formation of the double fold closure at a succeeding station, and finally discharges the closed and sealed bag onto a discharge conveyor or into suitable drying means.

Another object of the invention is to provide a machine of the character stated which employs novel mechanisms located at one station for first trimming and creasing a collapsed bag mouth presented thereto and for then forming a first fold adjacent the end of the trimmed bag mouth through the medium of an arcuate folding blade movable through a curvilinear path.

Another object of the invention is to provide a machine of the character stated which employs novel devices located at another operating station for completing the double fold closure of the bag and which include cooperatively disposed relatively movable hooked folding fingers.

Another object of the invention is to provide a machine of the character stated which includes means for bending the completely formed closure to a position substantially parallel to the top plane of the bag contents preparatory to presentation to a drier associated therewith.

Another object of the invention is to provide a machine of the character stated which is simple in design, and rugged in construction.

With these and other objects in view, the nature of which will become more apparent, the invention will be more fully understood by reference to the drawings, the accompanying detailed description, and the appended claims.

In the drawings:

Fig. 6 is a horizontal section taken on line 6—6 of Fig. 3;

Fig. 7 is an enlarged transverse vertical section taken on line 7—7 of Fig. 1 and illustrates the parts as they are disposed at the beginning of the formation of the final fold;

Fig. 8 is a horizontal section taken on line 8—8 of Fig. 7;

Figs. 9, 10, 11 and 12 are views similar to Fig. 7 but showing successive positions of the parts during formation of the final fold;

Fig. 13 is a vertical section taken on line 13—13 of Fig. 7;

Fig. 14 is a fragmentary detail view of a portion of the final fold forming mechanism and shows the fold pressing fingers disengaged from the bag closure;

Fig. 15 is an enlarged transverse vertical section taken on line 15—15 of Fig. 1;

Fig. 16 is a fragmentary front elevation taken on line 16—16 of Fig. 15;

Fig. 17 is an enlarged detail view of the actuating cam for the bag mouth creasing elements;

Fig. 18 is a similar view of the actuating cam for the arcuate first fold blade;

Fig. 19 is a view similar to Fig. 17 and shows the actuating cam for the trimming knife;

Fig. 20 is a view similar to Fig. 17 and shows the actuating cam for the second fold forming elements.

Figure 1:
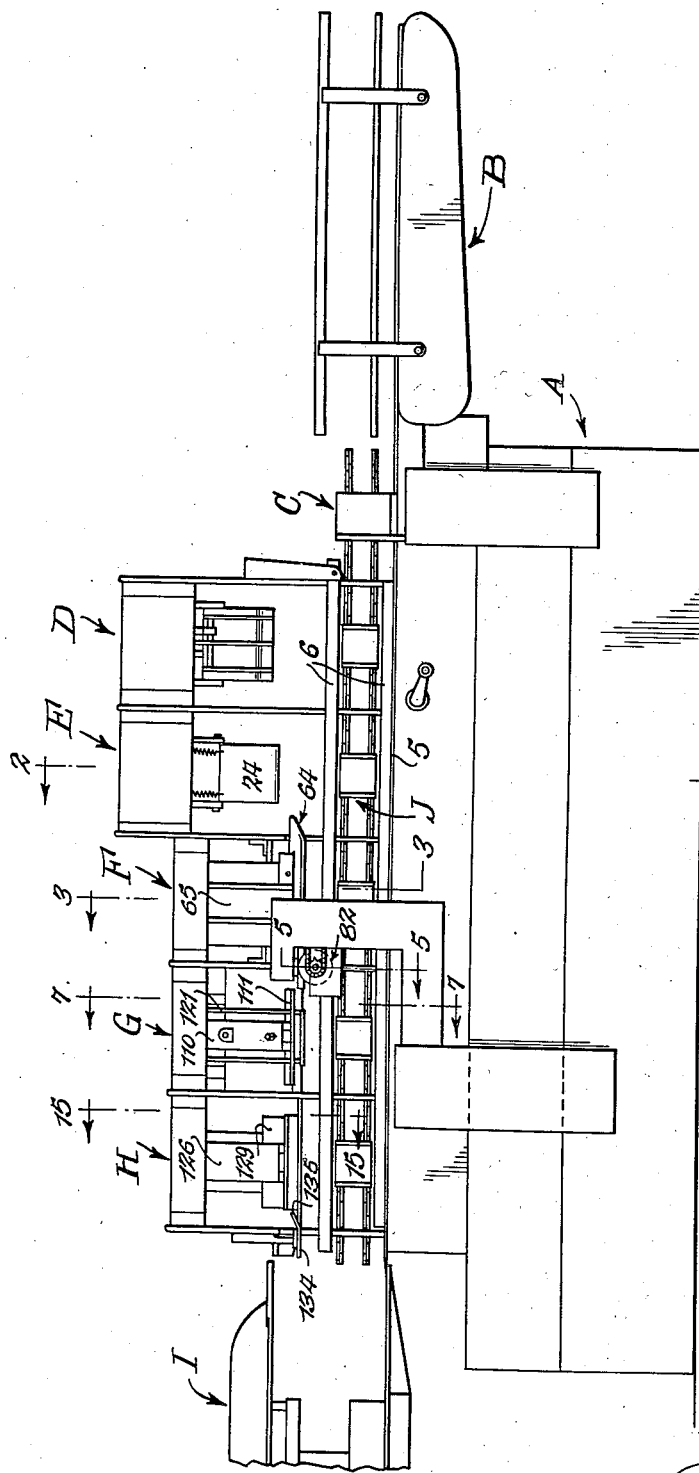
Fig. 1 is an enlarged front elevation of an automatic bag closure forming machine constructed in accordance with this invention.

Referring to the drawings in detail the invention as illustrated is embodied in an automatic bag closing and sealing machine including a main frame A, a filled bag supply conveyor B located to one side of the machine, a filled bag aligning a transfer station C, a bag mouth collapsing station D, a smoothing station E, a trimming, creasing and first fold-forming station F, a final fold-forming station G, and a closure aligning station H adapted to bend the formed closure to a position parallel to the top of a bag preparatory to ejecting the sealed bag into a rotary drier generally indicated at I.

The bag closing machine which includes the novel mechanisms constructed in accordance with this invention is generally similar to the machine disclosed in the United States Letters Patent No. 2,094,061 issued to R. N. Cundall, September 28, 1937. In the present structure the driving connections, the supply conveyor, the mechanism at the bag aligning and transfer station C, the mechanism at the bag mouth collapsing station D, the mechanism at the smoothing station E, and the mechanism of an intermittently operable bag transfer conveyor generally indicated at J and employed to move the bags to successive operating stations, are all substantially identical with the corresponding portions of the machine disclosed and described in the said United States Letters Patent No. 2,094,061 and it is therefore believed to be unnecessary to describe these parts in detail here.

The main frame A includes a table top 5 disposed in horizontal alignment with the bag supporting surface of the supply conveyor B. As the filled bags are moved by the conveyor B they are presented to an intermediate table (not shown) at the bag aligning and transfer station C. The transfer mechanism at station C is effective to move the bags onto the table top 5 and into alignment between spaced guide rails 6, 6. As the bags are individually moved onto the table top 5 they are received into forwardly projecting pockets of the intermittently movable conveyor J, the exact nature of which is fully described in the United States Letters Patent No. 2,094,061. A bag is then moved by the conveyor to the station D where the gussets are tucked and the bag mouth is collapsed. The next movement of the conveyor presents the bag to the station E where the collapsed bag mouth is smoothed out preparatory to trimming and creasing.

Figure 2:
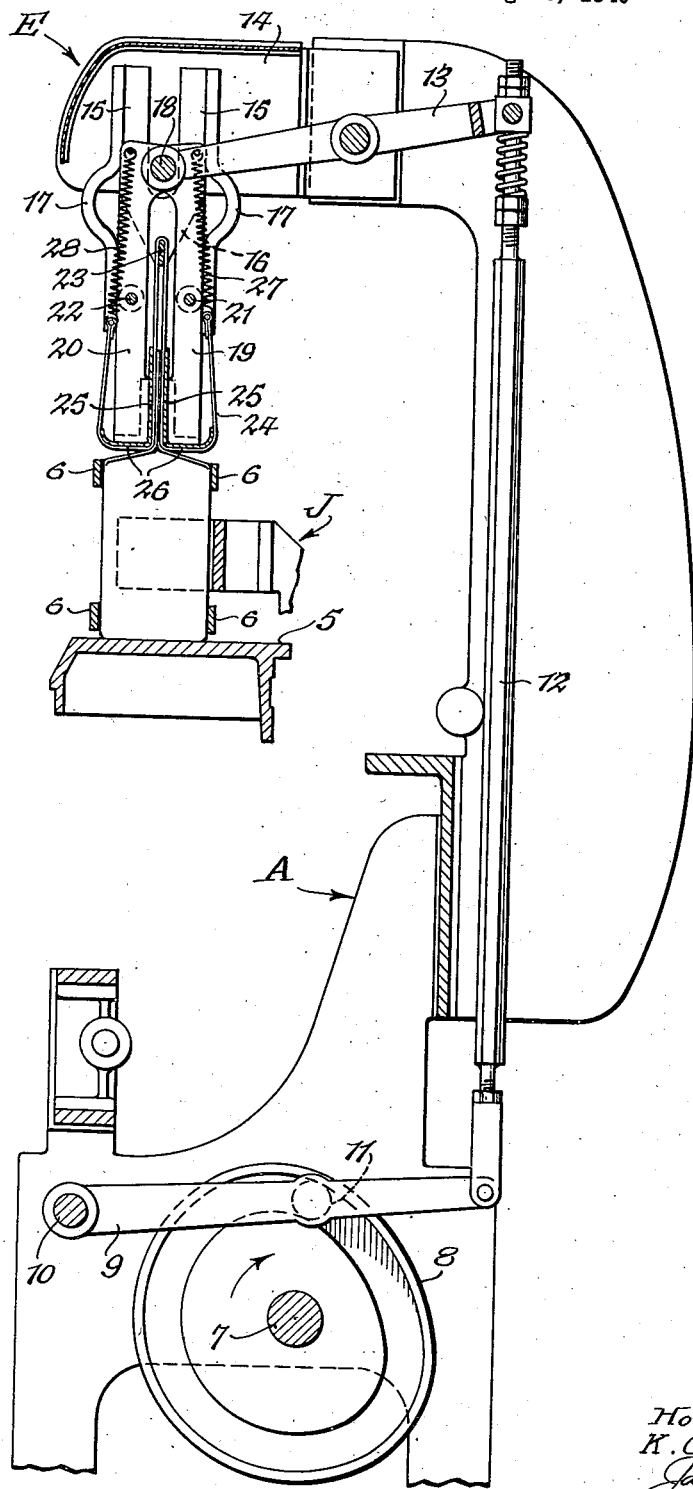
Fig. 2 is an enlarged transverse vertical section taken on line 2—2 of Fig. 1.

The driving connections of the machine include a main cam shaft 7 journalled in the frame A. An actuating cam 8, located at the smoothing station E (see Fig. 2) is secured to the cam shaft. The cam 8 oscillates a rock arm 9 which is pivotally connected to the frame at 10 through the medium of follower connections generally indicated at 11. The free end of the rock arm 9 is pivotally connected to the lower end of a vertically disposed link 12, the upper end of which is adjustably and pivotally connected to the rear ends of spaced levers 13 pivotally connected intermediate their ends to the main frame. The main frame is provided with a forwardly projecting cantilever portion 14 supporting opposed pairs of spaced depending guideways 15, 15. Each pair of guideways 15 is maintained in rigid position by a web portion 16 extending therebetween and formed integral therewith. Each guideway 15 is provided with a centrally disposed outwardly bowed portion 17, the function of which will be hereinafter described. The forward ends of the levers 13 are spanned by a rod 18 which carries a spaced pair of depending rear arms 19 and a spaced pair of depending forward arms 20. The rear arms 19 are maintained in spaced relation by a rod 21 which is adapted to engage in the outwardly bowed portions 17 of the rear guideways 15 and the forward arms 20 are maintained in spaced relation by a rod 22 which is adapted to engage the outwardly bowed portions 17 of the forward guideways 15. The outwardly bowed body portions 17 of the guideways permit the arms 19 and 20 to diverge outwardly when in the raised position to permit positioning of a bag mouth therebetween. Upon downward movement of the forward ends of the lever 13 the rods 21 and 22, and consequently the arms 19 and 20, are brought towards each other as the result of sliding of the bars over the bowed portions of the guideways into the more restricted vertical portions thereof. A bar 23 extends between the webs 16 and a strip 24 of heavy textile material, such as canvas, is draped thereover at substantially its mid point. The lower ends of each pair of depending arms 19 and 20 are respectively provided with a vertical clamping plate 25 which is bent horizontally to provide a surface 26 and terminates in a rounded end. The ends of the canvas strip 24 are brought around the surfaces 26 and are attached to tension springs 27 and 28 fixed to the depending arms 19 and 20.

As a bag is being presented to the smoothing station E from the mouth collapsing station D the forward ends of the levers 13 have been raised by action of the cam follower and link connections 8, 12 and the clamping plates 25 together with the associated portions of the canvas strip 24 are spaced apart a distance sufficient to permit ready entry of the collapsed bag mouth therebetween. At the time the bag comes to rest, the cam and follower connections 8, 12 are effective to lower the forward ends of the levers 13, the plates 25 sliding upon the outer surfaces of the canvas strip. Continued downward movement causes the rods 21 and 22 to engage the bowed portion 17 of the guideways and results in a consequent clamping of the bag mouth while continuously drawing together the sides of the bag end. It should be noted that this downward movement of the plates 25 does not continue to the point at which the horizontal surfaces 26 thereof would engage against the top level of the bag contents as such action would effect an undesirable packing of the contents. Continued rotation of the cam 8 effects a release of the clamping action and the bag is then moved to the trimming, creasing and first fold-forming station F.

Figure 3:
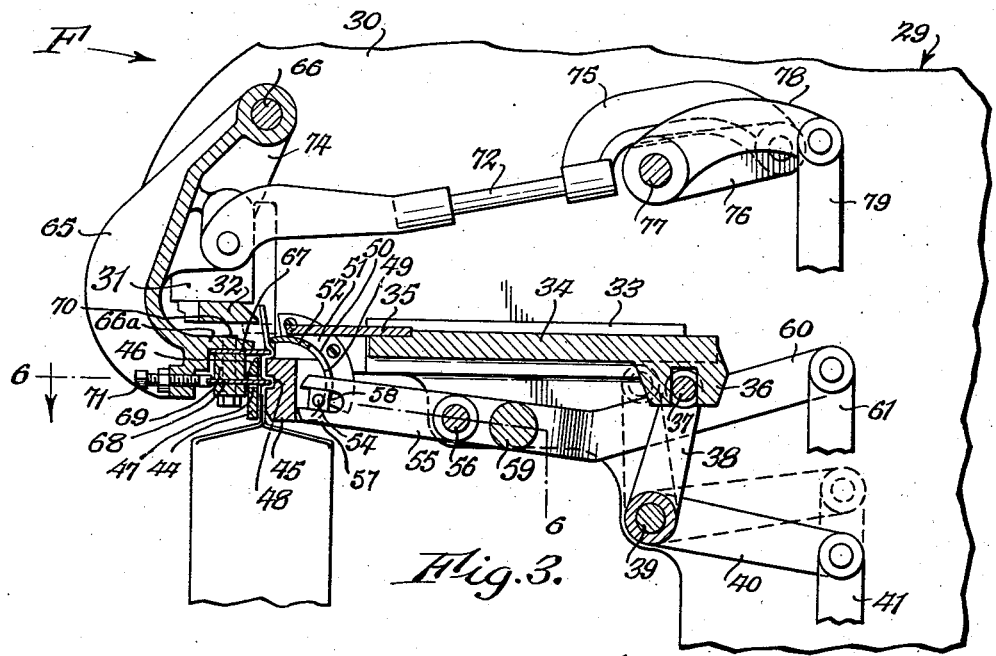
Fig. 3 is an enlarged transverse vertical section taken on line 3—3 of Fig. 1.
Figure 4:
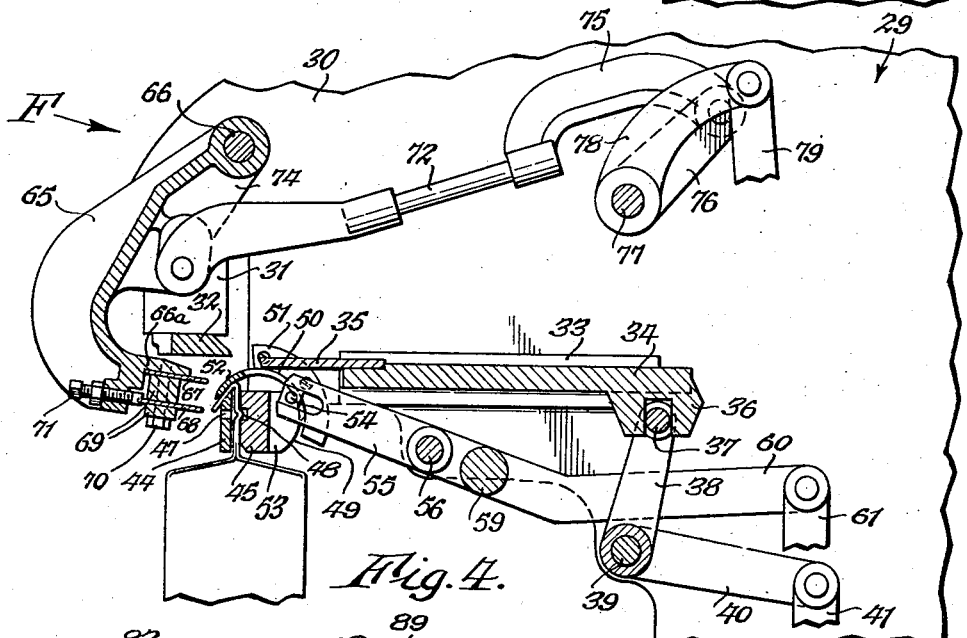
Fig. 4 is a view similar to Fig. 3, but showing the movable creasing blades in the retracted position and the arcuate folding blade in its fully projected position.
Figure 5:
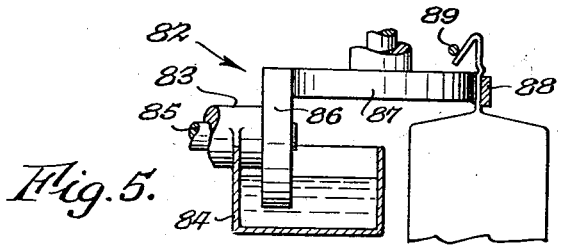
Fig. 5 is a vertical section taken on line 5—5 of Fig. 1.

The trimming, creasing and first fold-forming mechanism at station F is illustrated in Figs. 3, 4 and 6 of the drawings. The main frame is provided with a plurality of spaced parallel mounting brackets 29 having forwardly extending portions 30 between two of which the trimming and creasing elements are mounted. The end of each forwardly projecting portion 30 at the station F is provided with a depending post 31. A stationary trimming blade 32 spans the lower ends of the posts 31 and is rigidly secured thereto. A pair of horizontally disposed guideways 33 are secured to the opposing faces of the projections 30 and are located in a general plane slightly below the bottom plane of the trimming blade 32. The guideways 33 slidably support a reciprocable slide member 34 mounted therebetween and carrying at its forward end a trimming knife 35 rigidly secured thereto and disposed in shearing relation to the stationary blade 32. The rear end of the slide 34 is provided with a depending yoke 36 engageable with the cross bar 37 forming part of a bail 38. The bail 38 is pivotally mounted on a rock shaft 39 extending across the brackets 29 of stations F, G and H, and is adapted to be oscillated through a crank arm 40 which is connected by a link 41 and rock arm 42 to a shear actuating cam 43 secured to the main cam shaft 7 (see Fig. 19). Thus rotation of the cam 43 will effect a vertical reciprocation of the link 41, oscillation of the bail 38, and consequent horizontal reciprocation of the slide 34 to bring the trimming knife 35 into and out of shearing relation of the stationary blade 32.

As a bag is presented at the station F, the upstanding collapsed mouth thereof is received in the space between a pair of front and rear guide members 44 and 45 respectively which are rigidly secured intermediate the projection 30. The front guide member 44 is bevelled along its upper edge as at 46 to thereby define a wedge shaped forming element over which the first fold of the closure is adapted to be bent. The front guide is also provided with a horizontally disposed slot 47 located below the bevelled portion and through which a creasing blade is adapted to pass into engagement with the bag mouth located therebehind. The forward face of the rear guide member 45 is provided with a horizontal creasing groove 48 coextensive and in alignment with the slot 46 of the front guide 44. It should be noted that the upper forward edge of the rear guide 45 is disposed at the height at which the upper crease line is to be formed in the bag mouth as is the upper edge of the wedge shaped forming element 46. Thus the rear guide 45 serves also as a stationary creasing anvil. The rear of the guide 45 is shaped to provide a convex surface 49 which is complementary to a concave surface 50 spaced therefrom and formed in the forward face of a folding blade guide block 51 secured to each projection 30. The opposing arcuate surfaces 49 and 50 together define an arcuate guideway in which a folding blade 52 is mounted for curvilinear movement. Relatively wide slots 53 are formed in the rear of the guide 45 and are located adjacent the ends of the folding blade 52 associated therewith. The folding blade 52 is provided with a pair of oppositely projecting pivot pins 54 secured to the inner faces thereof at the ends and being disposed within the defined limits of the respective slots 53.

The folding blade 52 is adapted to be oscillated in the arcuate guideway through the medium of cam actuated linkage which includes a pair of spaced lever arms 55 pivotally mounted on a shaft 56 secured between the projections 30. The forward end of each lever 55 is provided with a bifurcation 57 slidably supporting a block 58, pivotally connected to the pin 54 of the oscillated folding blade. The levers 55 are rigidly maintained in spaced relation by a transverse spacing bar 59. One of the lever arms 55 is provided with a rear extension arm 60 pivotally connected at its end to the upper end of a link 61. The lower end of the link 61 is pivotally connected to the free end of a rock arm 62 which is pivotally connected to the main frame and adapted to be oscillated from the medium of cam and follower connections generally indicated at 63 (see Fig. 18).

The right hand ends of the guide members 44 and 45 are each provided with an outwardly divergent bevelled portion defining together a throat portion 64 which first receives a collapsed bag mouth and guides it into the space therebetween.

It should be observed that the folding blade 52 when in the full retracted position shown in Fig. 3 has its forward edge spaced from and in vertical alignment with the front face of the rear guide block and creasing anvil 45. The upper edge of the block 45 and the folding blade together define a space with which the upper crease is formed in a collapsed bag mouth, the edge of the block serving as the major abutment for the crease.

The movable creasing elements include a relatively wide depending arm 65 pivotally mounted on a rod 66 secured between the projections 30. The lower end of the arm 65 is provided with a rearwardly extending shoulder 66a beneath which spaced upper and lower creasing blades 67 and 68, respectively, are secured through the medium of spacing blocks 69 and clamping bolts 70. The lower creasing blade 68 may be slotted to receive the clamping bolts 70 and may be adjustably maintained in any desired forward or rearward position relative to the upper blade by adjusting screws 71 projecting rearwardly through the lower end of the arm 65 and engaging the forward edge of the blade. It should be noted that the lower creasing blade 68 is so spaced from the shoulder 66a that in the creasing position it is projectable through the slot 47 formed in the front guide block 44.

The arm 65 is adapted to be oscillated by cam and linkage connections to bring the blades 67 and 68 into and out of creasing relation with the anvil 45. These connections include a link 72 provided at its forward end with a clevis pivotally connected to a centrally disposed rearwardly extending web 74 formed integral with the arm 65. The rear end of the link 72 is provided with an offset extension 75 pivotally connected to the free end of a rearwardly extending crank arm 76 which is rigidly secured to a shaft 77 journalled in the brackets 29. A crank arm 78 which is rigidly secured to the shaft 77 is slightly longer than the arm 76 and extends in substantially the same direction. The free end of the arm 78 is pivotally connected to the upper end of a vertical link 79, the lower end of which is connected to a rock arm 80 pivoted on the main frame. The rock arm 80 is adapted to be oscillated from the main cam shaft 7 through cam and follower connections indicated at 81 (see Fig. 17). It should be observed that the cam 81 is symmetrical in nature to provide a resultant substantially uniform movement of oscillation to the depending arm 65 to thereby bring the creasing blades into and out of creasing engagement with the anvil.

As soon as the bag is presented to the trimming and creasing station F, rotation of the main cam shaft 7 first effects a reciprocation of the slide 34 and the associated trimming knife 35 to thereby trim the end of the collapsed bag mouth. As the forward limit of movement of the slide 34 is reached the cam and follower connections 81 are effective to oscillate the depending arm 65 rearwardly to bring the creasing blades 67 and 68 into bag mouth creasing relation with the anvil 45, the folding bar 52 remaining substantially stationary during the actual creasing. As continued movement of the cam and follower connections 81 effect the beginning of the return movement of oscillation of the arm 65, the cam and follower connections 63 become effective to project the folding blade 52 forwardly through its curvilinear path. It should be noted that the forward edge of the folding blade 52 is disposed in abutting relation to the adjacent surface of the creased bag mouth and that the forward movement of the folding blade will effect a bending of the upper panel of the creased bag mouth over the wedge shaped former portion 46 in the manner illustrated in Fig. 4. Further movement of the cam and follower connections 63 will retract the folding blade 52 to its initial position and the bag is then ready to be displaced past the adhesive applying mechanism to the final folding station G.

As the bag mouth is moved from the station F to the final fold forming station G a bar of adhesive is applied to the bag mouth by devices generally indicated at 82. The adhesive applying devices include a bearing boss 83 secured to the main frame in a suitable manner and provided with a depending open top container 84 adapted to hold a supply of adhesive. A shaft 85 driven by suitable power means (not shown) is journalled in bearing boss 83 and is provided at its rear end with a wheel 86 of sufficient diameter to be partially immersed in the adhesive in the container 84. An applicator wheel 87 having a thickness equal to the width of the desired bar of adhesive is rotatably supported on the main frame with its axis vertical. The front edge portion of the applicator wheel is disposed in surface contact with the rear face of the immersed wheel 86 and thereby receives a supply of adhesive therefrom. The rear edge of the wheel 87 is disposed in substantial surface contact with the bag mouth as it moves by and applies the bar of adhesive thereto. The bag mouth is prevented from drawing away from the applicator wheel by a pressure bar 88 rigidly maintained to the rear thereof and in surface contact therewith.

It should be noted that the first fold formed at the station F is prevented from opening completely by a horizontal guide and restraining rod 89 secured to the frame and extending between the stations F and G.

The mechanism for effecting the final fold is carried between one of the projections 30 of the station F and the projection 30 of the next adjacent bracket 29 and includes an open horizontal shelf 90 rigidly secured therebetween (see Figs. 7 to 12 inclusive). A forwardly projecting plate 91 having an upturned vertical flange 92 is rigidly secured to the front of the shelf 90. It should be noted that the flange 92 is disposed in alignment with the pressure resisting bar 88 opposite the adhesive applying wheel to thereby provide a smooth continuous back plate against which the collapsed bag mouth is adapted to be pressed.

The shelf 90 is provided with a pair of centrally disposed upstanding posts 93 located near the front thereof. A horizontal shaft 94 is journalled in the posts and has its ends projecting outwardly therebeyond. The shaft 94 carries a pinion 95 rigidly secured thereto intermediate the posts and is engaged by a rack 96 freely resting thereon. The rear end of the rack 96 is pivotally connected to one arm of a bell crank 97 journalled on the shaft 37 which extends past the station G. The rack is maintained in mesh with the pinion 95 through the medium of a bracket or sliding housing 98 pivotally mounted on the shaft 94 intermediate the posts 93. The other arm of the bell crank 97 is pivotally connected to the upper end of a vertical link 99, the lower end of which is connected to the free end of a rock arm 100 journalled on the shaft 10. The rock arm is adapted to be oscillated through the medium of cam and follower connections indicated at 101 (see Fig. 20).

The projecting ends of the shaft 94 are provided with crank discs 102 rigidly secured thereto and having crank pins 103 projecting outwardly from the faces thereof. A pair of spaced parallel arms 104 are pivotally connected to the respective crank pins 103. Each arm 104 is provided with a rearwardly extending yoke 105 slidably supported on a horizontal rod 106 extending between the brackets 29 to thereby support the rear end of the arms. The forward end of each arm 104 is provided with a depending finger 107 extending downwardly therebelow and provided at its end with a concavo-convex surface 108 engageable with the crease line of the first formed fold of the collapsed bag mouth.

The rod 109 is secured intermediate the projections 30 at the station G and pivotally supports a depending arm 110. A plate 111 having a width at least equal to the width of the bag mouth is pivotally connected at its forward edge, as at 112, to the lower end of the arm 110. The plate 111 is provided with an upwardly and rearwardly inclined fold controlling lip 113 having its rear edge normally disposed adjacent the lower crease line formed in the collapsed bag mouth and along which the final fold is adapted to be started. The plate 111 is provided with an upwardly inclined lug 114; and an adjusting screw 115, threadably engaged through the arm 110, abuts the lug 114 and determines the uppermost position at which the plate 111 may be maintained. The plate 111 is constantly urged upwardly towards contact with the end of the adjusting screw 115 by a tension spring 116 extending between the arm 110 and the end of the lug 114.

A bracket 117, including a horizontal bar portion 118, is secured between the projections 30 and is provided with means generally indicated at 119 for adjustably positioning the arm 110 in a front to rear position such that the rear edge of the plate lip 113 is normally disposed adjacent or slightly above the lower crease line about which the final fold is formed. The bracket 117 is provided with a pair of spaced forwardly extending lugs 120 which support a pair of rigidly mounted depending fingers 121. The lower ends of the fingers 121 are provided with rearwardly directed arcuate portions 122 having radii of curvature which substantially coincide with the locus of the crease of the first fold as it is moved through space during the formation of the final fold. Thus the arcuate portion 122 functions to control and position the first folded portion of the closure during the formation of the final fold thereof. The ends of the arcuate portions may be maintained in position by a spacing bar 123 rigidly secured therebetween. It should be noted that the plate 111 is slotted as at 124 to provide clearance for the depending fingers 121.

At the time a bag is presented to the station G the parts comprising the final fold forming mechanism assume the positions indicated in Fig. 7 of the drawings. At this time rotation of the cam 101 will effect a forward projection of the rack 96 through the medium of the linkage and bell crank connections as described to thereby effect a partial rotation of the pinion 95 and of the crank discs 102. Since the bars 104 are pivotally connected to the crank pins 103 the forward ends of the bars will partake of a substantial harmonious movement and the depending fingers 107 thereof will be effective to move the crease line of the first formed fold downwardly and forwardly through a substantially arcuate path to thereby begin the formation of the final fold. As the final folding is started, the rear edge of the plate lip 113 is disposed adjacent the lower crease line and serves as a temporary creasing blade over which the fold is effected. Continued downward movement of the fingers 107 will apply a downward force to the adjacent end of the plate 111 and the associated lip 113 and will therefore cause the plate to swing downwardly about its pivot 112 and will also cause the arm 110 to pivot forwardly about its mounting shaft 109 (see Fig. 9). Continued forward projection of the rack 96 will bring the forward end thereof into abutting relation with the rear face of the depending arm 110 and will effect a further forward movement of oscillation thereof to thereby disengage the lip 113 from the bag mouth. At this disengaging movement of the lip 113 is taking place the depending fingers 107 are being moved downwardly and rearwardly by action of the crank pins 103 to complete the formation of the final fold. As the extreme limit of forward movement of the rack 96 is reached, the action of the crank pins 103 will effect a slight rearward movement of the depending fingers 107 to thereby clamp the formed closure between the fingers and the flange 92 which serves as a backing plate. Continued rotation of the cam 101 will effect a retraction of the rack 96 and a return of all of the above described parts to the position indicated in Fig. 7.

It should be noted that the forward end of the rack 96 may be provided with a forwardly projecting abutment screw 125 which may be regulated to vary the distance through which the arm 110 may be swung and thereby vary the time at which the lip 113 becomes disengaged from the closure flap.

The formation of the closure per se is completed at the station G. However, it is necessary to positively maintain the closure in the sealed position for a short time to thereby permit the adhesive to become firmly set before the bag is subjected to additional handlings. The setting of the adhesive bond of the closure is accomplished in the drier I. After the bag leaves the final fold forming station G it is presented to the station H where the formed closure is bent forwardly to a horizontal position overlying the top plane of the bag contents. As the bag is presented to the station H the closure thereof is disposed to the rear of a generally horizontal guide plate which comprises an arm 126 dependably secured to the horizontal shaft 109 and which is provided at its lower end with a rearwardly projecting plate 127. A second arm 128 is journalled on the shaft 109 and is provided at its lower end with a rearwardly projecting presser foot 129 adapted to overlie the plate 127 in spaced relation thereto. The arm 128 is provided with a rearwardly extending lug 130 which is pivotally connected to one end of a link 131 having its other end pivotally connected to one arm of a bell crank 132. The bell crank 132 is journalled on the shaft 39 and has its other arm pivotally connected to the upper end of a vertical link 133. The lower end of the link 133 is connected to rock arm and cam follower connections substantially identical with the cam, rock arm, and follower connections shown in Fig. 17. When a closed bag has been presented at the station H the closure thereof is disposed in alignment with the plate 127 and the cam and follower connections which oscillate the bell crank 132 are effective to swing the arm 128 forwardly. The presser foot 129 which is secured to the lower end of the arm is effective to first bend the closure forwardly over the plate 127 and then lightly apply pressure thereto.

The next movement of the conveyor will bring the horizontally disposed closure of the bag into engagement with and beneath a horizontally disposed plate 134 having an upwardly inclined lip portion 135 adapted to engage the first presented portion of the closure. The plate 134 serves to maintain the closure in the substantially horizontal position as the bag is moved from the station H into the drier I wherein the closure is maintained in its tightly formed position during setting of the adhesive.

It is believed that since the operation of the mechanisms at each of the several stations was described in detail it will be unnecessary to describe the operation of the machine as a whole in detail. It should be pointed out, however, that a number of bags are operated upon simultaneously by the machine, each of the bags undergoing a more progressively complete operation effective in the formation of the closure.

Thus it will be seen that the herein disclosed invention provides a novel machine for automatically closing and sealing the mouths of filled paper bags and for particularly forming the double-fold closures of slack filled bags; which employs novel mechanisms located at one station for first trimming and creasing a collapsed bag mouth presented thereto and for then folding a first fold adjacent the end of the trimmed bag mouth through the medium of an arcuate folding blade movable through a curvilinear path; which employs novel devices located at another operating station for completing the double fold closure of the bag and which include cooperatively disposed relatively movable hooked folding fingers; and which is simple in design and rugged in construction.

It is of course to be understood that certain details of arrangement and proportions of parts may be variously modified without exceeding the scope of the appended claims.

We claim:

1. In a machine for closing and sealing slack filled paper bags having collapsed upstanding mouths, means for forming spaced upper and lower crease lines below the end of said bag mouth, and means including an arcuately cross-sectioned folding blade having an edge engageable with the end portion of said bag mouth and projectable forwardly and downwardly over said upper crease line for folding the end of said bag mouth along the said upper crease line.

2. In a machine for closing and sealing slack filled paper bags having collapsed upstanding mouths, means for trimming said collapsed bag mouth to a predetermined height, means for forming spaced upper and lower crease lines below the end of said bag mouth, and means including an arcuately cross-sectioned folding blade having an edge engageable with the end portion of said bag mouth and projectable forwardly and downwardly over said upper crease line for folding the end of said bag mouth along the said upper crease line.

3. In a machine for closing and sealing slack filled paper bags wherein is provided a main frame, a plurality of operating stations mounted on said frame and including bag mouth manipulating mechanisms, and an intermittently operable conveyor associated with said operating stations and adapted to present a filled bag to each of said stations successively; the mechanism of one of said operating stations being effective to trim and crease a collapsed bag mouth and comprising means for trimming said bag mouth to a predetermined height, means for forming spaced upper and lower crease lines below the trimmed end of said bag mouth, and means including a folding blade movable in a curvilinear path for folding the end of said bag mouth along the upper crease line.

4. In a machine for closing and sealing slack filled paper bags having collapsed upstanding mouths, means for forming spaced upper and lower crease lines below the end of said bag mouth, means for folding the end of said bag mouth along the upper crease line to form a first closure fold, means for folding said bag mouth along the lower crease line to form the final closure fold, and stationary additional means effective during formation of the final fold for confining the final fold panel to a predetermined path of travel whereby the closure as a whole will be tightly formed.

5. In a machine for closing and sealing slack filled paper bags having collapsed upstanding mouths, means for trimming said collapsed bag mouth to a predetermined height, means for forming spaced upper and lower crease lines below the end of said bag mouth, means for folding the end of said bag mouth along the upper crease line to form a first closure fold, means for folding said bag mouth along the lower crease line to form the final closure fold, and stationary additional means effective during formation of the final fold for confining the final fold panel to a predetermined path of travel whereby the closure as a whole will be tightly formed.

6. In a machine for closing and sealing slack filled paper bags having collapsed upstanding mouths, means for forming spaced upper and lower crease lines below the end of said bag mouth, means including a folding blade movable in a curvilinear path for folding the end of said bag mouth along the upper crease line to form a first closure fold, means for folding said bag mouth along the lower crease line to form the final closure fold, and means effective during formation of the final fold for confining the final fold panel to a predetermined path of travel whereby the closure as a whole will be tightly formed.

7. In a machine for closing and sealing slack filled paper bags having collapsed upstanding mouths, means for trimming said collapsed bag mouth to a predetermined height, means for forming spaced upper and lower crease lines below the end of said bag mouth, means including a folding blade movable in a curvilinear path for folding the end of said bag mouth along the upper crease line to form a first closure fold, means for folding the said bag mouth along the lower crease line to form the final closure fold, and means effective during formation of the final fold for confining the final fold panel to a predetermined path of travel whereby the closure as a whole will be tightly formed.

8. In a machine for closing and sealing slack filled paper bags having collapsed upstanding mouths, means for forming spaced upper and lower crease lines below the end of said bag mouth, means for folding the end of said bag mouth along the upper crease line to form a first closure fold, means for folding said bag mouth along the lower crease line to form the final closure fold and including a folding blade normally disposed adjacent said lower crease line, and folding fingers engageable with the upper portion of the first fold and effective to bend the first fold over said folding blade along said lower crease line, said folding blade being displaceable during formation of the said final fold to thereby permit the fold to be completed, and means effective during formation of the final fold for confining the final fold panel to a predetermined path of travel whereby the closure as a whole will be tightly formed.

9. In a machine for closing and sealing slack filled paper bags having collapsed upstanding mouths, means for trimming said collapsed bag mouth to a predetermined height, means for forming spaced upper and lower crease lines below the end of said bag mouth, means for folding the end of said bag mouth along the upper crease line to form a first closure fold, means for folding the said bag mouth along the lower crease line to form the final closure fold and including a folding blade normally disposed adjacent said lower crease line, and folding fingers engageable with the upper portion of the first fold and effective to bend the first fold over said folding blade along said lower crease line, said folding blade being displaceable during formation of the said final fold to thereby permit the fold to be completed, and means effective during formation of the final fold for confining the final fold panel to a predetermined path of travel whereby the closure as a whole will be tightly formed.

10. In a machine for closing and sealing slack filled paper bags having collapsed upstanding mouths, means for forming spaced upper and lower crease lines below the end of said bag mouth, means including a folding blade movable in a curvilinear path for folding the end of said bag mouth along the upper crease line to form a first closure fold, means for folding said bag mouth along the lower crease line to form the final closure fold and including a folding blade normally disposed adjacent said lower crease line, and folding fingers engageable with the upper portion of the first fold and effective to bend the first fold over said folding blade along said lower crease line, said folding blade being displaceable during formation of the said final fold to thereby permit the fold to be completed, and means effective during formation of the final fold for confining the final fold panel to a predetermined path of travel whereby the closure as a whole will be tightly formed.

11. In a machine for closing and sealing slack filled paper bags having collapsed upstanding mouths, means for trimming said collapsed bag mouth to a predetermined height, means for forming spaced upper and lower crease lines below the end of said bag mouth, means including a folding blade movable in a curvilinear path for folding the end of said bag mouth along the upper crease line to form a first closure fold, means for folding said bag mouth along the lower crease line to form the final closure fold and including a folding blade normally disposed adjacent said lower crease line, and folding fingers engageable with the upper portion of the first fold and effective to bend the first fold over said folding blade along said lower crease line, said folding blade being displaceable during formation of the said final fold to thereby permit the fold to be tightly formed, and means effective during formation of the final fold for confining the final fold panel to a predetermined path of travel whereby the closure as a whole will be tightly formed.

12. A closing and sealing machine for paper bags wherein is provided a main frame, means for collapsing the mouth of a bag to be closed, and means for smoothing the upstanding collapsed bag mouth; a mechanism-containing operating station including a stationary creasing anvil disposed to the rear of and below the top of said collapsed bag mouth, movable creasing elements located in front of said collapsed bag mouth and being effective when engaged with said anvil to form spaced upper and lower fold defining creases, means for moving said creasing elements into and out of creasing engagement with said anvil, and means located adjacent said creasing anvil for bending the collapsed bag mouth about said upper crease line to form a first closure fold, said folding means including a folding blade projectable forwardly and downwardly over said anvil and through a curvilinear path.

13. A closing and sealing machine for paper bags wherein is provided a main frame, means for collapsing the mouth of a bag to be closed, and means for smoothing the upstanding collapsed bag mouth; an operating station including a stationary creasing anvil disposed to the rear of and below the top of said collapsed bag mouth, movable creasing elements located in front of said collapsed bag mouth and being effective when engaged with said anvil to form spaced upper and lower fold defining creases, means for moving said creasing elements into and out of creasing engagement with said anvil, means located adjacent said creasing anvil for bending the collapsed bag mouth about said upper crease line to form a first closure fold, said folding means including a folding blade projectable forwardly and downwardly over said anvil and through a curvilinear path, and means for actuating said folding blade.

14. A closing and sealing machine for paper bags wherein is provided a main frame, means for collapsing the mouth of a bag to be closed, and means for smoothing the upstanding collapsed bag mouth; an operating station including means for trimming the end of said collapsed bag mouth, a stationary creasing anvil disposed to the rear of and below the top of said collapsed bag mouth, movable creasing elements located in front of said collapsed bag mouth and being effective when engaged with said anvil to form spaced upper and lower fold defining creases, means for moving said creasing elements into and out of creasing engagement with said anvil, means located adjacent said creasing anvil for bending the collapsed bag mouth about said upper crease line to form a first closure fold, said folding means including a folding blade projectable forwardly and downwardly over said anvil and through a curvilinear path, and means for actuating said folding blade.

15. A closing and sealing machine for paper bags wherein is provided a main frame, means for collapsing the mouth of a bag to be closed, and means for smoothing the upstanding collapsed bag mouth; a mechanism-containing operating station including a stationary creasing anvil disposed to the rear of and below the top of said collapsed bag mouth, movable creasing elements located in front of said collapsed bag mouth and being effective when engaged with said anvil to form spaced upper and lower fold defining creases, means for moving said creasing elements into and out of creasing engagement with said anvil, means located adjacent said creasing anvil for bending the collapsed bag mouth about said upper crease line to form a first closure fold, said folding means including a folding blade projectable forwardly and downwardly over said anvil and through a curvilinear path, another mechanism-containing operating station effective to form the final fold of the closure and comprising a folding blade normally disposed adjacent the lower fold defining crease about which the final fold is formed, folding fingers engageable with the first folded portion of the bag mouth and effective to bend said first folded portion over said folding blade along said lower crease line to thereby form the final closure fold, said folding blade being displaceable during formation of the said final fold to thereby permit the fold to be completed, and means intermittently operable for presenting the bags to be closed to successive operating stations.

16. In a machine for closing and sealing slack filled paper bags having collapsed upstanding mouths, means for forming spaced upper and lower crease lines below the end of said bag mouth, means for folding the end of said bag mouth along the upper crease line to form a first closure fold, means for applying a bar of adhesive to said bag mouth along a line disposed below said first formed fold, means for folding the first closure fold along the lower crease line onto the adhesive coated portion of said bag mouth to form the final closure fold and including a folding blade normally disposed adjacent said lower crease line, and folding fingers engageable with the upper portion of the first folded portion and effective to bend the first folded portion over said folding blade along said lower crease line, said folding blade being displaceable during formation of the said final fold to thereby permit the fold to be completed, and means effective during formation of the final fold for confining the final fold panel to a predetermined path of travel whereby the closure as a whole will be tightly formed.

17. In a machine for closing and sealing slack filled paper bags having collapsed upstanding mouths, means for forming spaced upper and lower crease lines below the end of said bag mouth, means for folding the end of said bag mouth along the upper crease line to form a first closure fold, means for applying a bar of adhesive to said bag mouth along a line disposed below said first formed fold, means for folding the first closure fold along the lower crease line onto the adhesive coated portion of said bag mouth to form the final closure fold and including a folding blade normally disposed adjacent said lower crease line, folding fingers engageable with the upper portion of the first folded portion and effective to bend the first folded portion over said folding blade along said lower crease line, said folding blade being displaceable during formation of the said final fold to thereby permit the fold to be completed, and a backing bar disposed to the rear of said bag mouth, said folding fingers also being effective to squeeze said completely formed closure against said backing bar to thereby assure positive contact of the closure panels with said adhesive, and means effective during formation of the final fold for confining the final fold panel to a predetermined path of travel whereby the closure as a whole will be tightly formed.

18. In a machine for closing and sealing slack filled paper bags having collapsed upstanding mouths, means for forming spaced upper and lower crease lines below the end of said bag mouth, means for folding the end of said bag mouth along the upper crease line to form a first closure fold, means for applying a bar of adhesive to said bag mouth along a line disposed below said first formed fold, means for folding said bag mouth along the lower crease line to form the final closure fold and including a folding blade normally disposed adjacent said lower crease line, folding fingers engageable with the upper portion of the first fold and effective to bend the first fold over said folding blade along said lower crease line, said folding blade being displaceable during formation of the said final fold to thereby permit the fold to be completed, a backing bar disposed to the rear of said bag mouth, said folding fingers also being effective to squeeze said completed closure against said backing bar to thereby assure positive contact of the closure panels with said adhesive, and means effective during formation of the final fold for confining the final fold panel to a predetermined path of travel whereby the closure as a whole will be tightly formed.

HOWARD G. ALLEN.
K. CLIFFORD SAUNDERS.